June 27, 1967 G. L. TRAVERS 3,327,754
DEMOUNTABLE FLANGE RIMS FOR WHEELS
Filed July 20, 1965
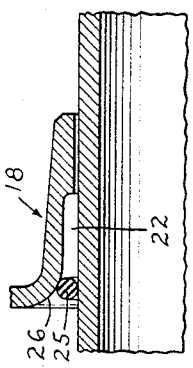
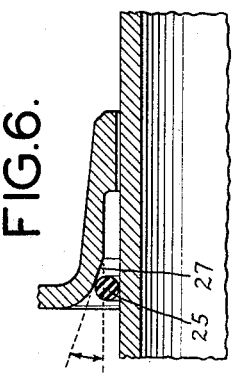
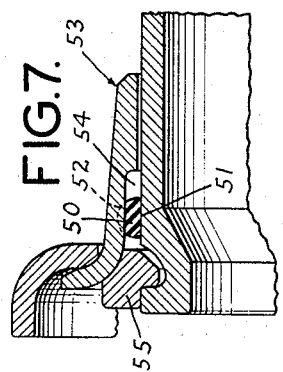
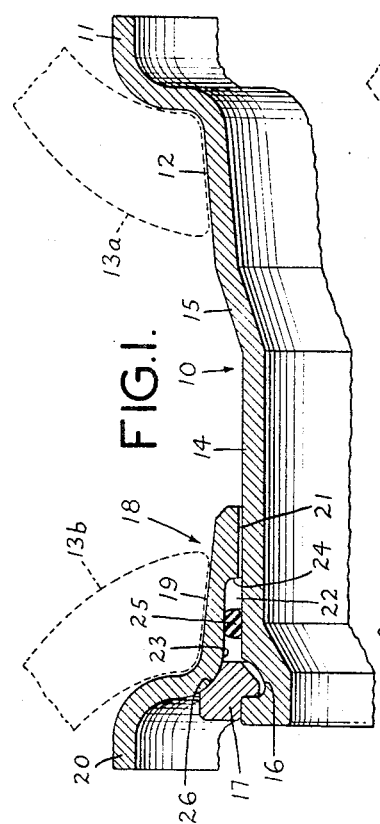
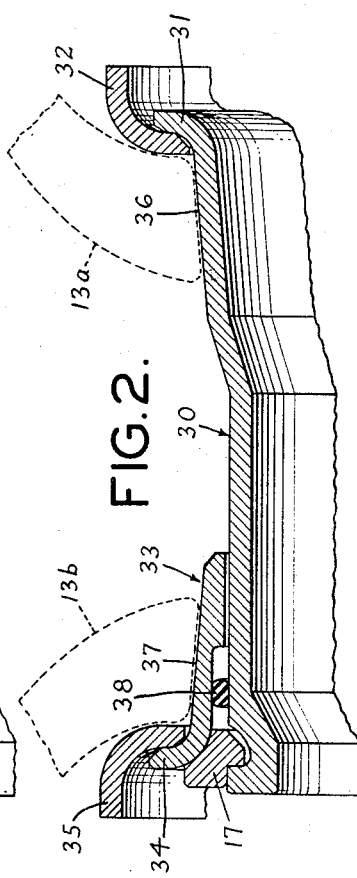
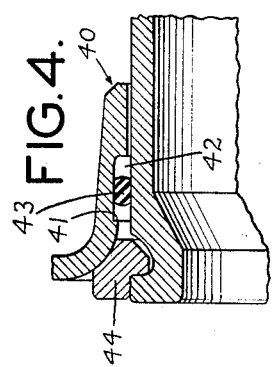
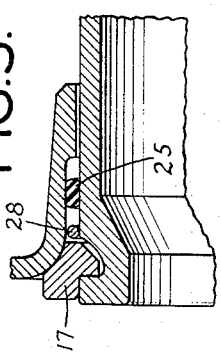
INVENTOR
GEORGES LOUIS TRAVERS
BY
HIS ATTORNEYS United States Patent Office 3,327,754
Patented June 27, 1967

3,327,754
DEMOUNTABLE FLANGE RIMS FOR WHEELS
Georges Louis Travers, Clermont-Ferrand, France, assignor to Compagnie Generale des Etablissements Michelin, raison sociale Michelin & Cie, Clermont-Ferrand, France
Filed July 20, 1965, Ser. No. 473,455
Claims priority, application France, July 28, 1964, 983,365, Patent 1,410,338; Sept. 25, 1964, 989,477, Patent 86,820; Apr. 30, 1965, 15,478, Patent 87,985
9 Claims. (Cl. 152—410)

This invention relates to improvements in wheel rims having at least one demountable rim flange, and more particularly to means for sealing demountable rim flanges to wheel rims to enable them to be used with tubeless tires.

Demountable flange rims for tubeless tires generally have two tapered seats against which the tire beads are wedged in sealing relation. One of the seats is integral with the base of the rim while the other is on a ring detachably mounted on the base of the rim and under the pressure of the inflated tire seats against a split locking ring received in a groove in the rim base. The tire beads are supported laterally by means of rim flanges either integral with the tapered seats or resting against low radial flanges extending from the tapered seats.

For tubeless tires, the detachable rim flange and bead seat must be sealed to the rim base when the elements of the rim and the tire are assembled. The tire seals readily with the bead seats due to the tapered shape of the latter but additional means must be provided to seal the bead seat ring to the rim base to enable the tire to be inflated. Usually a resilient gasket is mounted in a seat provided for it in the base of the rim and engages the demountable bead seat and rim flange ring. The various prior sealing arrangements are not free of disadvantages. In particular, sealing can only be assured when the gasket, the rim base and the bead seat ring are in a predetermined relationship. As a result, leakage occurs if the beads of the tire during mounting take a position too far away from their final position as they have a tendency to do with tires having very flexible sides, such as, for example, a radial ply tire. The bead seat ring in this situation does not engage the gasket and in order to seal the space between the rim base and the bead seat, a device is required to force the beads to move apart until the bead seat ring bears against the gasket.

A further disadvantage of the prior rims is that the groove or seat for the gasket in the rim base weakens it and makes its manufacture more complicated and costly. In addition, the gasket is subjected to radial and axial pressures which tend to shear or extrude it, thereby creating a leak.

Rims embodying the present invention have none of these disadvantages although they include a rim base, a split locking rim, a demountable tapered or conical bead seat ring and one or two demountable flanges.

In accordance with the invention, the rim base and the bead seat ring have an annular cavity between them bounded by two concentric, generally cylindrical surfaces defining a recess between the inside of the bead seat ring and the rim base for receiving a sealing gasket or ring of elastic material, such as, for example, natural or synthetic rubber, which is compressed radially and is capable of limited axial movement so that it is not required to assume a predetermined position axially of the recess.

The structure described above insures complete sealing between the rim base and the conical bead seat ring even when the sealing ring or gasket has been deformed during mounting of the tire and despite its lack of compression in an axial direction and regardless of its position in the annular recess. Sealing rings of the type used in the new rim can be of circular, semi-circular or other shape in cross-section. However, a ring of circular cross-section, such as an O-ring, is advantageous in mounting the tire for the reason that its shape permits it to roll into the recess between the rim base and the conical bead seat ring when the latter is displaced axially along the rim base during inflation of the tire mounted on the rim. In some cases, a ring having an inner cylindrical surface and an outer convex surface also is advantageous.

For a better understanding of the present invention, reference may be had to the accompanying drawings in which—

FIGURE 1 is a view in cross-section through a portion of a wheel rim embodying the present invention with the beads of a tire shown in dotted lines;

FIGURE 2 is a view in cross-section where a portion of a modified form of wheel rim embodying the invention with the tire beads shown in dotted lines;

FIGURE 3 is a fragmentary cross-sectional view of a modified form of wheel rim embodying the invention;

FIGURE 4 is a fragmentary cross-sectional view of another form of wheel rim embodying the invention;

FIGURE 5 is a fragmentary cross-sectional view of a portion of a wheel rim of the type shown in FIGURE 1 illustrating the insertion of the sealing ring therein;

FIGURE 6 is a fragmentary cross-sectional view of another form of wheel rim showing the insertion of the sealing ring therein; and FIGURE 7 is a fragmentary cross-sectional view of a wheel rim of the type shown in FIGURE 2 utilizing a different form of sealing ring.

A wheel rim embodying the present invention and having an integral demountable rim flange and bead seat thereon is shown in FIGURE 1. The rim base 10 has a fixed rim flange 11 at one edge which merges into an inwardly inclined or conical bead seat 12 against which a tire beads 13a seats and seals. The rim base 10 also includes a cylindrical portion 14 joined to the seat 12 by means of a more sharply inclined or conical portion 15. Adjacent the left-hand edge of the cylindrical portion 14 is a groove 16 for receiving a split locking ring 17 for retaining a demountable bead seat and rim flange ring 18 on the rim base 10. The bead seat and rim flange ring 18 has a tapered or conical seat 19 for receiving a tire bead 13b in sealing relation thereto and a rim flange 20 which restrains the bead 13b against movement to the left. An inner cylindrical surface 21 on the ring 18 is slidably received on the cylindrical portion 14 of the rim base 10. An annular recess 22 is formed in the inner surface of the ring 18 having a cylindrical wall 23. The recess has an open outer end and an inner end closed by a shoulder 24 extending substantially perpendicular to and between the surface 21 and the wall 23. Mounted within the recess 22 is a sealing ring 25 which is initially of circular cross-section but is compressed radially for the reason that its cross-sectional diameter is greater than the radial distance between the cylindrical portion 14 of the rim base and the wall 23. The sealing ring 25 serves to prevent the escape of air from the interior of the tire between the cylindrical portion 14 and the flange and bead seat ring 18 as will be described hereinafter.

In use, when a tire is to be mounted on the rim 10, the split ring 17, the flange and bead seat ring 18 and the sealing ring 25 are removed. The tire is pushed onto the rim base 10 and its bead 13a is pushed as tightly as possible against the bead seat 12. Thereafter, the ring 18 is pushed onto the cylindrical portion 14 of the rim base and pushed as far as possible between the bead 13b and the rim base 10. In most cases the beads 13a and 13b will not be fully seated on the conical seats 12 and 19. As shown in FIGURE 5, the sealing gasket or ring 25 is then pushed into engagement with the ring 18 so that it closes the open end of the recess 22. The split ring 17 can then be snapped in place and inflation of the tire started. As a result of inflation of the tire, the bead 13a will be forced against its bead seat 12 and the bead 13b will be forced up the seat surface 19 while the ring 18 will be moved as a whole bodily toward and into engagement with the split ring 17. During movement of the ring 18 to the left, it will override the sealing ring 25 and cause it to roll between the surfaces 14 and 23 into a position between the open and closed ends of the recess 22 as shown in FIGURE 1 where the ring 25 is compressed radially and is retained when the tire is fully inflated. To facilitate the entry of the ring or gasket 25 into the recess 22, the surface 26 at the junction of the rim flange 20 with the outer end of the surface 23 is curved gradually so that a tangent to the surface 26 at the point of contact of the ring 25 therewith is inclined at an angle of about 15° to 25° to the axis of the rim. If desired, and as shown in FIGURE 6, a conical or tapered surface 27 may be provided for engaging the sealing ring 25, this surface being inclined at an angle between 15° and 25° to the axis of the rim.

While it might be expected that the inflation pressure of the tire would tend to force the sealing gasket or ring 25 against the split locking ring 17, this will not normally occur for the reason that the flattened cross-section of the compressed ring resists both rolling and sliding of the ring. However, when the tire is inflated to higher than normal pressure for use in muddy or wet terrain, the presence of moisture may enable the ring 25 to slide axially. In the event that such higher inflation pressures are contemplated, a small endless ring 28 formed of metal or the like may be introduced between the split locking ring 17 and the sealing ring 25, as shown in FIGURE 3. The ring 28 will prevent contact of the sealing ring 25 with the sharp edges on opposite sides of the split in the split locking ring and thereby prevent damage to the sealing ring. Instead of the special ring 28, a second sealing ring 25 can be used with equally good results.

FIGURE 4 discloses another form of the invention in which means is provided for preventing the sealing ring from engaging the split locking ring of the wheel rim. In this modification, the bead seat ring 40 is provided with a shoulder 41 at the outer end of and only partially spanning the recess 42 which prevents axial sliding movement of the sealing ring 43 through a distance sufficient to enable it to engage the split locking ring 44.

FIGURE 2 illustrates a modification of the rim described above in that the rim base 30 is provided at one edge with a low radial flange 31 and a demountable rim flange 32 which is retained on the rim base by the low flange 31. Also, the bead seat ring 33 is provided with a low radial flange 34 for supporting a demountable rim flange 35. Inasmuch as the tire beads seal against the tapered or conical seats 36 and 37, additional sealing means is not required between the flanges 31 and 32 and the flanges 34 and 35. Leakage between the bead seat ring 33 and the rim base 30 is prevented by the compressible sealing ring 38, in the manner described above.

FIGURE 7 illustrates a wheel rim similar to that shown in FIGURE 2 with the exception that the sealing ring 50 is of semi-circular shape having a cylindrical or flat inner surface 51 and a normally convex outer surface 52. This form of ring is useful with tires which have relatively stiff sides preventing the bead seat ring 53 from being pushed onto the wheel rim far enough to cause the sealing ring or gasket to roll into the recess as the tire in inflated. The sealing ring 50 is pushed into the recess 54 as far as possible with a suitable tool and then the split locking ring 55 is attached to the rim. Movement of the bead seat ring 53 toward the split locking ring 55 will cause the ring 53 to ride over the convex surface 52 of the sealing ring while the latter is held against axial movement on the rim base by its flat engagement with the rim base.

In all of the forms of the invention, radial compression of the sealing ring produces an air-tight seal between the rim base and the demountable bead seat ring, the compressed state of the sealing ring also preventing it from being shifted against the split locking ring, except when higher than normal inflation pressures are used and, in all events, preventing the ring from being extruded from between the bead seat ring and the rim flange.

The provision of the elongated recess for receiving the sealing ring also greatly facilitates the mounting of the tire on the rim. A preliminary seal is obtained by pushing the sealing ring into contact with the bead seat ring and the rim base, after which the movement of the bead seat ring axially of the rim base will properly position the sealing gasket and compress it so that a final and effective seal against leakage is attained.

It will be understood that other modifications and variations may be made in the wheel rim base and in the bead seat ring demountably carried thereon, and therefore the forms of the invention disclosed herein should be considered as illustrative. Accordingly, the invention is limited only as defined in the following claims.

I claim:
1. A vehicle wheel rim for tubeless tires comprising a rim base having a first seat for sealing engagement with one bead of a tubeless tire, a rim flange adjacent to said seat for engaging said bead, a ring demountably and slidably received on said rim base, a second seat on said ring for sealing engagement with the other bead of said tire, a rim flange on said ring for engaging said other bead, means forming an elongated annular recess having a closed inner end and an open outer end between said ring and said rim base, a free annular gasket of resilient material in said recess, said open end being of sufficient width for insertion of said gasket therethrough into said recess, said gasket having greater cross-sectional dimensions than the radial dimension of said recess and being compressed between said rim base and said ring, and a split ring detachably mounted on said rim base and substantially covering said open outer end of said recess for retaining said ring on said rim base.

2. The rim set forth in claim 1 in which said rim base has a cylindrical outer surface forming a radially inner wall of said recess and said ring has a cylindrical inner surface spaced radially from said inner wall and forming a radially outer wall of said recess and a shoulder on said ring substantially perpendicular to said walls forming the closed end of said recess.

3. The rim set forth in claim 2 in which said ring has an outwardly diverging surface at the open outer end of said recess to facilitate insertion of said gasket therein.

4. The rim set forth in claim 3 in which said diverging surface is curved.

5. The rim set forth in claim 3 in which said diverging surface is conical and inclined at an angle between about 15° and 25° to the axis of said rim base.

6. The rim set forth in claim 1 in which said gasket is normally circular in radial cross-section and is compressed in said recess to a non-circular cross-section.

7. The rim set forth in claim 1 in which said gasket is normally semi-circular in radial cross-section and has an inner cylindrical surface engaging said rim base, said gasket being compressed to a non-circular cross-section in said recess.

8. The rim set forth in claim 1 comprising an endless ring in said recess between said gasket and said split ring for preventing engagement of said gasket with said split ring.

9. The rim set forth in claim 1 in which said rim base has a cylindrical outer surface forming a radially inner wall of said recess and said ring has a cylindrical inner surface spaced radially from said inner wall and forming a radially outer wall of said recess, a first shoulder on said ring substantially perpendicular to said walls forming the closed end of said recess, and a second shoulder on and extending inwardly from said ring adjacent the open end of said recess and only partially spanning the open end of said recess.

References Cited

UNITED STATES PATENTS

| | | | |
|---|---|---|---|
| 2,788,050 | 4/1957 | Le Jeune | 152—410 |
| 2,874,748 | 2/1959 | Powers | 152—410 X |
| 2,969,825 | 1/1961 | Sinclair et al. | 152—410 |
| 3,067,796 | 12/1962 | Atkin | 152—410 |

ARTHUR L. LA POINT, *Primary Examiner.*

C. W. HAEFELE, *Assistant Examiner.*